United States Patent [19]
Platte

[11] Patent Number: 6,041,159
[45] Date of Patent: *Mar. 21, 2000

[54] TELECOMMUNICATIONS DEVICE HAVING A REMOTE CONTROLLER

[75] Inventor: Hans-Joachim Platte, Hemmingen, Germany

[73] Assignee: Deutsche Thomson-Brandt GmbH, Villingen-Schwenningen, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/658,138

[22] Filed: Jun. 4, 1996

[30] Foreign Application Priority Data

Jul. 11, 1995 [DE] Germany ............................ 195 25 226

[51] Int. Cl.⁷ ...................................................... H04N 5/76
[52] U.S. Cl. .............................. 386/46; 358/908; 348/907
[58] Field of Search ................................ 386/46, 83, 95, 386/96, 65, 52; 358/908; 348/907, 734; 360/721; H04N 5/76

[56] References Cited

U.S. PATENT DOCUMENTS

| | | | |
|---|---|---|---|
| 4,628,377 | 12/1986 | Harigaya | 360/72.1 |
| 4,752,834 | 6/1988 | Koombes | 358/335 |
| 4,782,401 | 11/1988 | Faerber et al. | 358/335 |
| 4,930,160 | 5/1990 | Vogel | 380/23 |
| 5,333,091 | 7/1994 | Iggulden et al. | 360/14 |
| 5,696,866 | 12/1997 | Iggulden et al. | 358/908 |
| 5,708,477 | 1/1998 | Forbes et al. | 358/908 |

FOREIGN PATENT DOCUMENTS

| | | | |
|---|---|---|---|
| 0735754A2 | 10/1996 | European Pat. Off. | H04N 7/00 |
| 4106246 | 3/1992 | Germany | H04N 5/44 |
| 4208932 | 4/1993 | Germany | H04N 17/00 |
| 4313107 | 4/1994 | Germany | H04N 17/00 |
| 9410959 | 11/1994 | Germany | H04N 5/44 |
| 4332291 | 3/1995 | Germany | H04N 5/44 |
| 9418711 | 3/1995 | Germany | H04N 5/44 |
| 4303942 | 5/1995 | Germany | H04N 5/00 |
| WO 97/02567 | 1/1997 | WIPO | G11B 27/10 |
| WO 97/02568 | 1/1997 | WIPO | G11B 27/10 |
| WO 97/03442 | 1/1997 | WIPO | G11B 27/10 |

OTHER PUBLICATIONS

JP 58–146072 A. In: Patent Abstracts of Japan, P–1332, Apr. 3, 1992, vol. 16, No. 131.

*Primary Examiner*—Huy Nguyen
*Attorney, Agent, or Firm*—Joseph S. Tripoli; Peter M. Emanuel; Paul P. Kiel

[57] ABSTRACT

A telecommunications device having a remote controller, which device contains a circuit arrangement for automatic identification of additional information in a program channel by means of which circuit arrangement a transmission of the program channel is classified into a first type for a desired transmission and into a second type for additional information. An additional button on the remote controller gives a user of the remote controller the capability to correct an incorrect classification of the transmission by means of the circuit arrangement. The circuit arrangement can be equipped with automatic-learning logic which, when a button is operated, revises previous decisions relating to the classification and redefines its criteria for the correct changeover time.

5 Claims, 1 Drawing Sheet

TELECOMMUNICATIONS DEVICE HAVING A REMOTE CONTROLLER

BACKGROUND OF THE INVENTION

1. Field of the Invention

The invention is based on a telecommunications device having a control unit, for example a remote controller, which device contains a circuit arrangement for automatic classification, by means of which a transmission of the programme channel is classified into a first type for a desired transmission and into a second type for additional information or an undesired transmission. Devices of this type, for example television receivers and video recorders, can normally be controlled using a remote controller.

2. Related Art

Television transmissions, in particular films, are frequently interrupted by additional information, for example advertisement transmissions. These are arranged in blocks one after the other and normally last a number of minutes. These interruptions are frequently annoying for the user of a video recorder who is more often looking, for example, at specific recorded films. Circuit arrangements are therefore known, for example from U.S. Pat. No. 5,333,091, which identify advertisement blocks during a transmission and jump over them during replay with a video recorder.

However, since there are no generally applicable criteria from which it is possible to derive when a transmission is interrupted by an advertisement block, it is possible for this circuit arrangement not to identify the correct changeover time, or to identify it too late.

SUMMARY OF THE INVENTION

The object of the present invention is therefore to develop a telecommunications device having a remote controller, which device contains a circuit arrangement for automatic identification of additional information in a programme channel, in such a manner that it offers a user a more reliable and more functional application.

This object is achieved by the invention and developments of the invention specified in the claims.

The invention is based on the knowledge that a circuit arrangement for automatic identification of additional information in a programme channel must evaluate a plurality of criteria for a decision as to whether a desired transmission (Type 1) or additional information (Type 2) is currently being transmitted, since no criterion on its own will reliably suffice to classify a transmission as Type 1 or Type 2. The exact changeover time is not always determined by the circuit arrangement on the basis of these criteria, and the changeover time is repeatedly not identified or is incorrectly identified. The remote controller for the telecommunications device is therefore equipped with an additional button, by means of which a user, when operating this button, informs the circuit arrangement of the fact that a non-identified or incorrectly identified change has taken place between the two types.

The circuit arrangement can additionally be equipped with an operating mode in which, when the button is operated, it once again works out decisions, which have taken place shortly before then, relating to the classification and stores the time of the decision for the most probable preceding changeover in this time period between the two types as the new changeover time in a data store, for example on a video cassette.

The telecommunications device is, for example, a video recorder, using which a transmission can be stored on a storage medium, on tape or on optical disk. During replay of a stored transmission, the circuit arrangement which is contained therein results, when the button is operated, in errors which have already been made with respect to decisions about classification being worked out once again with the aim of correction, and the time of the most probable preceding changeover in this time period being defined as the changeover time between the two types. Subsequently, the video recorder rewinds, for example, the storage medium to this time and marks this time on the storage medium as the changeover time. Alternatively, the video recorder can store this time on an additional data store of the storage medium. This avoids rewinding. When the stored transmission is replayed in the future, the newly determined changeover time will then be taken into account. The correction can also be used for learning adaptation of the classification criteria.

The additional button can advantageously be provided with a double function, by means of which, when the second function is operated, the circuit arrangement interprets this time as a change which has just taken place between the two types, and stores this time as the changeover time.

The double functions of the button can be activated, for example, by operating the button once or twice (single click or double click) or by operating it briefly and for a long time.

BRIEF DESCRIPTION OF THE DRAWINGS

Exemplary embodiments of the invention are explained with reference to the schematic drawings, in which.

DETAILED DESCRIPTION OF THE INVENTION

Figure 1:
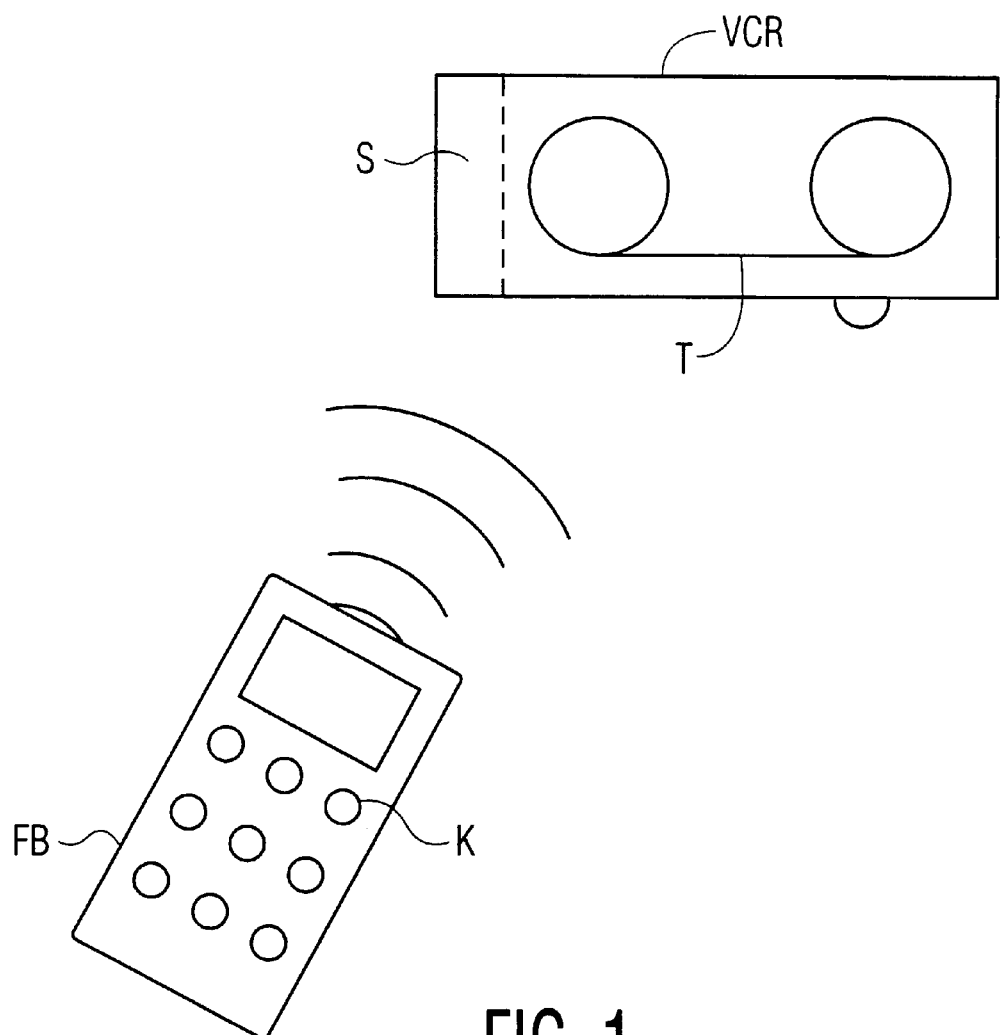
FIG. 1 shows a remote controller with a video recorder.

The video recorder VCR in FIG. 1 contains a circuit arrangement S for automatic identification of additional information, for example advertising, in a programme channel. A transmission of the programme channel is classified in sections by the circuit arrangement into a first type of a desired transmission and into a second type for the additional information. When a transmission is being recorded, the type is also stored on the video tape T, in sections, in addition to the transmission. During replay, only the first type is then normally played, and the second type of transmission is jumped over.

The remote controller FB of the video recorder VCR contains an additional button K, by means of which a user informs the circuit arrangement S of the video recorder VCR of the fact that the incorrect type of transmission is being played or has just been jumped over. This button makes it possible for the user to act interactively when the circuit arrangement has not identified a correct changeover time between Type 1 and Type 2. If, for example, the circuit arrangement has not identified the start of an advertisement block in good time during replay, then the user can switch the video recorder to fast forward until the next changeover point, by pressing the button K. Alternatively, when the button K is operated, the video recorder VCR can once again work out decisions, which have taken place shortly before then, relating to classification, determine the time for the most probable changeover preceding the pressing of the button, and rewind the tape to this time. This time is then stored on the tape as the correct changeover time and can be taken into account correctly when the transmission is replayed in the future.

The circuit arrangement S can advantageously be equipped with automatic-learning logic which, when the button K is pressed, checks the criteria relating to the classification and matches them to the changed conditions, for example at the transmitter end. In particular, the button K can be equipped with a double function, for example single or double operation or pressing the button for a long time and pressing the button for a short time. When the second function is operated, the user can inform the circuit arrangement S of a changeover time which has just taken place. The automatic-learning logic of the circuit arrangement analyses the criteria which are present at this time and stores them for future decisions relating to classification. The changeover time is simultaneously marked on the tape.

Figure 2:
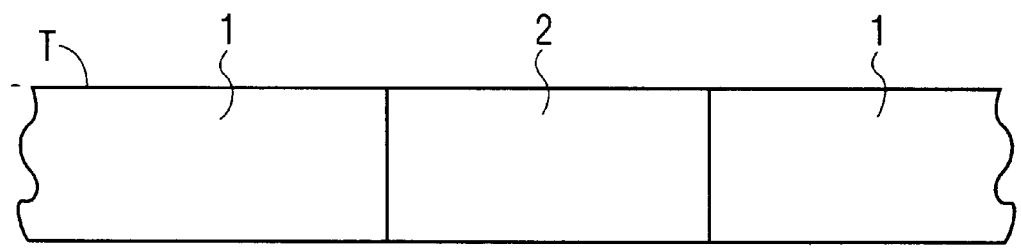
FIG. 2 shows a detail of a video tape with various programme material.

FIG. 2 illustrates a video tape T which contains programme material of the first Type 1 and programme material of the second Type 2. When a transition from Type 1 to Type 2 takes place, and vice versa, changeover times are additionally marked. The fast forward to jump over the Type 2 can be designed in such a manner that pictures relating to the transmission can still be seen on the screen of the associated television set. If an advertisement block is now jumped over and the circuit arrangement S does not identify the end of the advertisement block in good time, then the user can also change over the circuit type of the transmission once again in this case by operating the button K, and can switch the video recorder to replay. Preceding decisions can likewise be revised by the automatic-learning logic for this changeover time.

The invention can also be applied to other telecommunications devices with a remote controller which store information on other magnetic or even optical media and contain a corresponding circuit arrangement S for automatic identification of additional information in a programme channel. For example, a video cassette can also be equipped with a storage chip in which changeover times can be stored.

The exemplary embodiments so far relate to telecommunications devices which, during recording, store both Type 1 and Type 2 of the programme channel and jump over Type 2 during replay. A further field of application is, however, also devices which classify a transmission into Type 1 and Type 2 in real time and replay and record only Type 1. For example, a television set or a computer can be equipped with a circuit arrangement S for automatic identification of additional information in a programme channel, by means of which circuit arrangement S a transmission of the programme channel is classified into Type 1 or Type 2. A user can then use the additional button K of the remote controller FB to inform the circuit arrangement S of an incorrectly identified changeover time.

The telecommunications device can also be, for example, a device which is connected between a television set and a video recorder and masks out advertisement blocks between these two devices during the transmission or controls the video recorder in such a manner that advertisement blocks are masked out.

A further field of application of the invention is radios having a remote controller, in which a circuit arrangement S masks speech elements, such as news or an advertisement, out of a music transmission.

I claim:
1. Telecommunications device comprising:
a circuit arrangement for distinguishing between information and program sections of a transmission in a program channel, wherein said circuit arrangement classifies said transmission of said program channel into a first type of a desired transmission and into a second type of additional information, said circuit arrangement evaluating a plurality of parameters to decide whether said first type of a desired transmission or said second type of additional information is being transmitted; and
a remote controller having a button which, when operated, causes said circuit arrangement to correct a previous transmission classification which is inappropriate or undesired from the point of view of a user, wherein said circuit arrangement works out again decisions that have taken place in a time period shortly before said button is operated and relate to said previous transmission classification with the aim of correction, defines a closest probable time for the decision for the preceding changeover between said two types in this time period as a new changeover time, and redefines parameters on which future transmission classification is based by matching the parameters to conditions of said new changeover time.

2. Telecommunications device according to claim 1, wherein said circuit arrangement matches and redefines said plurality of parameters in the sense of an automatic-learning system, said plurality of parameters being used for deciding whether said first type of a desired transmission or said second type of additional information is currently being transmitted and to determine changeover times.

3. Telecommunications device comprising:
a circuit arrangement for distinguishing between information and program sections of a transmission in a program channel, wherein said circuit arrangement classifying said transmission of said program channel into a first type of a desired transmission and into a second type of additional information, said circuit arrangement evaluating a plurality of parameters to decide whether said first type of a desired transmission or said second type of additional information is currently being transmitted;
a storage medium for storing a transmission; and
a remote controller having a button which, when operated, causes said circuit arrangement to correct a prior transmission classification which is inappropriate or undesired from the point of view of a user wherein said circuit arrangement
works out again decisions that have taken place in a time period shortly before the operation of said button and relate to said classification with the aim of correction, and
defines a closest probable time for the decision for the preceding changeover between said two types in said time period as a new changeover time,
wherein when a stored transmission is replayed, said circuit arrangement reclassifies a portion of said stored transmission, when said button is operated, in a time period shortly before said button is operated, whereby decisions which have taken place in said time period are re-evaluated and the closest probable time for a changeover as a changeover time between said first and second type is defined, and the storage medium is reset to said probable time and said probable time is stored on said storage medium.

4. Telecommunications device according to claim 3, wherein said button is provided with a second function, said second function being activated by a double click on said button, by means of which said circuit arrangement is informed of a change which has just taken place between said first and second types of transmission.

5. Telecommunications device according to claim 3, wherein said circuit arrangement matches and redefines said plurality of parameters in the sense of an automatic-learning system, said plurality of parameters being used for deciding whether said first type of a desired transmission or said second type of additional information is currently being transmitted and to determine changeover times.

* * * * *